No. 734,547. PATENTED JULY 28, 1903.
H. HALSEY.
ELECTRIC BATTERY.
APPLICATION FILED APR. 18, 1902.
NO MODEL.

Witnesses
Robert H. Jilland
Lester C. Taylor

Henry Halsey Inventor
By his Attorney
C. W. Edwards

No. 734,547.

Patented July 28, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 734,547, dated July 28, 1903.

Application filed April 18, 1902. Serial No. 103,644. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to batteries, and especially to that class of batteries employing a movable element submerged in the electrolyte.

The object of the present invention is to provide means whereby the advantages derived from the use of a movable element may be attained without moving the element itself.

According to my present invention I propose to provide means for moving the electrolyte, maintaining the same in constant motion, or varying the rate of movement of the electrolyte, thereby permitting the elements to be rigidly mounted in the battery and also permitting a simple and compact arrangement of the parts of the battery.

The invention will be more fully described with references to the form thereof shown in the accompanying drawings.

Figure 1:
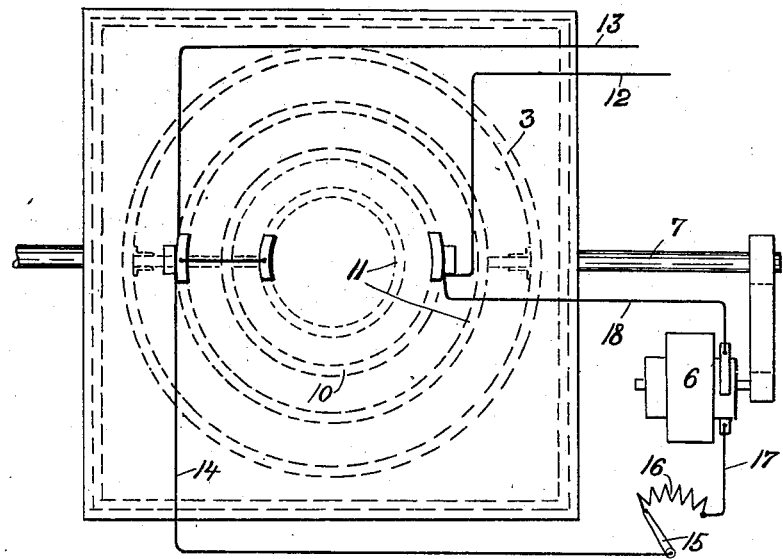
Figure 2:
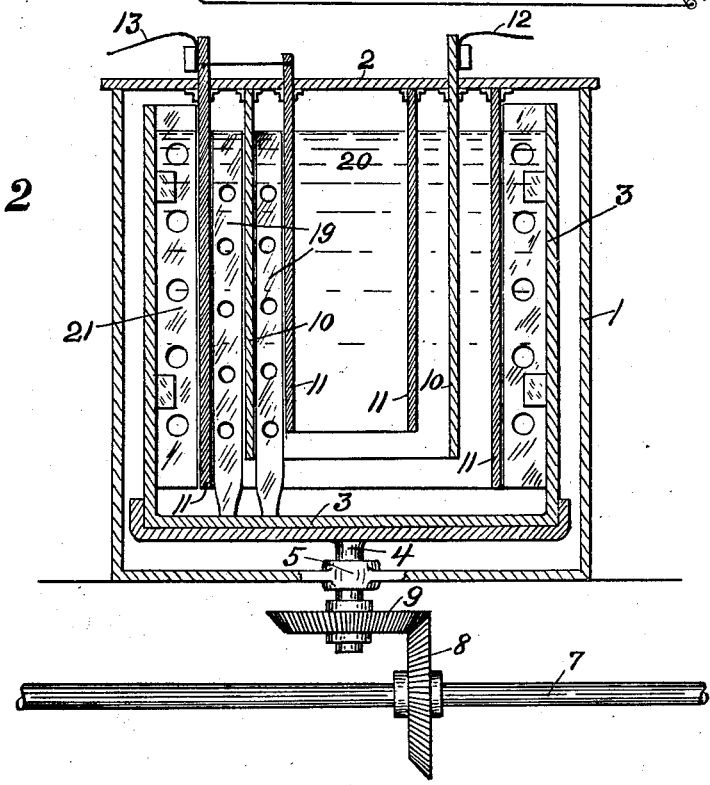

Figure 1 is a top view of a battery embodying my invention, and Fig. 2 is a sectional view of the said battery.

Referring more particularly to the drawings, 1 represents a suitable case in which the elements are to be arranged, and 2 represents the cover therefor. A receptacle 3 is mounted upon a vertical shaft 4, mounted in the bearing 5 in the bottom of the case. By any convenient means—such as the electric motor 6, driving the shaft 7, which shaft is geared to shaft 4 by gears 8 and 9—the receptacle 3 is revolved. The respective elements 10 and 11 are mounted in the cover 2 and project downward into the receptacle 3. Any number of elements may be employed, and these elements may be connected according to any well-known plan.

12 and 13 are conductors from the respective elements.

The motor 6 may be operated from any source. In the drawings means are shown for driving the motor with current derived from the battery. Such means comprise the conductor 14 from one terminal of the battery to the controller-arm 15, which contacts with the resistance 16, which resistance is connected by conductor 17 with the motor. From the motor conductor 18 leads to the other terminal of the battery.

Suitable brushes 19 19, which are made of any convenient material—such, for example, as hard rubber—are mounted in the receptacle 3 and are arranged to brush against the active surfaces of the elements 10 and 11. It is not essential that the brushes shall actually make contact with the elements, or, in fact, to brush against the same. The brushes should, however, be of sufficient area to insure that when the receptacle 3 is revolved the brushes will move the electrolyte around in the channel between the elements.

The number of brushes employed is of course immaterial, and their location is also largely a matter of selection. If the electrolyte is perfectly free to flow around the various elements, it will in many instances be sufficient to provide only the brushes 21, carried by the receptacle 3, which brushes when the receptacle is revolved will create a circular flow of the electrolyte.

The form of the brushes is of course largely a matter of design. They may be solid or perforated, as shown in the drawings, or of any desired shape.

The operation of the battery is as follows: The electrolyte 20 is placed in the receptacle 3. The cover 2, which carries the elements 10 and 11, is then placed in position and the circuit 12 13 closed. The circuit through the motor is also closed. The initial output of the battery is sufficient to revolve the motor, which through shaft 7, gears 8 and 9, and shaft 4 causes the receptacle and the electrolyte to be moved around in the space between the elements. The constant brushing of the electrolyte against the elements will prevent polarization of the latter, and as long as the speed of the motor is maintained at its predetermined maximum the current from the battery will be maintained approximately constant. The current may of course be regulated in the ordinary manner by resistance in the external circuit. The current may also be regulated by varying the speed of the motor 6, and thus varying the rate of movement of the electrolyte. When the rate of movement of the electrolyte is reduced, the current from the battery will be correspondingly reduced.

It will be understood that the construction above described is capable of various modifications without departing from the spirit of the invention, and I therefore desire it to be understood that I do not limit myself herein to the specific construction shown.

Having thus described my invention, I declare that what I claim as new, and desire to secure by Letters Patent, is—

1. In a battery, the combination with the electrolyte and the elements, of means for maintaining a horizontal flow of the electrolyte in the cell, the electrolyte brushing against the elements, substantially as described.

2. In a battery, the combination with the electrolyte and the elements, of a brush projecting into the electrolyte and adapted to circulate the same in a horizontal direction, and means for maintaining movement of said brush, substantially as described.

3. In a battery, the combination with the electrolyte and the elements, of a brush projecting into said electrolyte and adapted to circulate the same in a horizontal direction, and means for maintaining movement of said brush at varying rates of speed.

4. In a battery, the combination of a plurality of elements concentrically arranged, and means for maintaining a horizontal flow of the electrolyte in the spaces between the elements, the electrolyte brushing against the elements and means for controlling the operation of said above-named means, substantially as described.

5. In a battery, the combination of a receptacle containing the electrolyte, a cover, battery elements carried by said cover and projecting into the electrolyte, a brush in said electrolyte, and means for maintaining movement of said brush.

6. In a battery, the combination of a receptacle containing the electrolyte, a cover, battery elements carried by said cover and projecting into the electrolyte, a brush in said electrolyte, and means for maintaining movement of said brush in the electrolyte at varying rates of speed.

7. In a battery, the combination of a receptacle containing the electrolyte, a cover, battery elements carried by said cover and projecting into the electrolyte, a brush mounted in said receptacle, and means for maintaining movement of the receptacle, substantially as described.

8. In a battery, the combination of a receptacle containing the electrolyte, a cover, a plurality of concentrically-arranged elements carried by said cover and projecting into the electrolyte, a brush or brushes carried by said receptacle and projecting into the spaces between said elements, and means for rotating the receptacle, substantially as described.

9. In a battery, the combination of a receptacle containing the electrolyte, a cover, a plurality of concentrically-arranged elements carried by said cover and projecting into the electrolyte, a rotatable horizontal support, and a vertical brush or brushes mounted on said support, and adapted to be moved bodily around in the space between the elements, substantially as described.

10. In a battery, the combination of a receptacle containing the electrolyte, a cover, a plurality of concentrically-arranged elements carried by said cover and projecting into the electrolyte, a rotatable horizontal support, and a vertical brush or brushes mounted on said support, and adapted to be moved bodily around in the space between the elements, said brush or brushes having perforations therein, substantially as described.

In testimony whereof I affix my signature in presence of two witnesses.

HENRY HALSEY.

Witnesses:
HENRY BEST,
C. V. EDWARDS.